United States Patent
Kosuge et al.

(10) Patent No.: US 9,399,411 B2
(45) Date of Patent: Jul. 26, 2016

(54) SLIDING STRUCTURE FOR VEHICLE SEAT

(71) Applicant: KAWASAKI JUKOGYO KABUSHIKI KAISHA, Hyogo (JP)

(72) Inventors: Hideyoshi Kosuge, Kobe (JP); Fortik Loran, Lincoln, NE (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/579,036

(22) Filed: Dec. 22, 2014

(65) Prior Publication Data

US 2016/0176316 A1    Jun. 23, 2016

(51) Int. Cl.
| F16M 13/00 | (2006.01) |
| B60N 2/07 | (2006.01) |
| B60N 2/08 | (2006.01) |
| B60N 2/005 | (2006.01) |

(52) U.S. Cl.
CPC .......... *B60N 2/07* (2013.01); *B60N 2/005* (2013.01); *B60N 2/0812* (2013.01); *B60N 2/0875* (2013.01)

(58) Field of Classification Search
CPC combination set(s) only.
See application file for complete search history.

(56) References Cited

U.S. PATENT DOCUMENTS

| 4,632,452 | A | * | 12/1986 | Vogel | ................. | A47C 5/043 |
| | | | | | | 297/232 |
| 5,568,961 | A | * | 10/1996 | Colasanti | ................. | B60N 2/68 |
| | | | | | | 297/354.1 |
| 5,722,731 | A | * | 3/1998 | Chang | ................. | B60N 2/0705 |
| | | | | | | 297/344.1 |
| 6,089,665 | A | * | 7/2000 | Andrigo | ................. | B60N 2/06 |
| | | | | | | 248/424 |
| 8,152,215 | B1 | | 4/2012 | Tsumiyama et al. | | |
| 8,465,074 | B2 | * | 6/2013 | Sakata | ................. | B60N 2/3011 |
| | | | | | | 296/186.4 |
| 8,556,331 | B2 | * | 10/2013 | Tsumiyama | ................. | B60J 5/0487 |
| | | | | | | 296/146.5 |
| 8,668,236 | B1 | * | 3/2014 | Yamamoto | ................. | B60P 3/423 |
| | | | | | | 296/26.11 |
| 8,714,618 | B1 | * | 5/2014 | Heit | ................. | B60P 3/423 |
| | | | | | | 296/64 |
| 8,752,879 | B1 | * | 6/2014 | Heit | ................. | B60P 3/423 |
| | | | | | | 296/39.1 |
| 8,813,895 | B2 | * | 8/2014 | Endo | ................. | B60N 2/002 |
| | | | | | | 177/136 |
| 2001/0010431 | A1 | * | 8/2001 | Sasaki | ................. | B60N 2/2806 |
| | | | | | | 297/250.1 |
| 2007/0274616 | A1 | * | 11/2007 | Schrimpl | ................. | B60N 2/06 |
| | | | | | | 384/34 |

(Continued)

*Primary Examiner* — Monica Millner
(74) *Attorney, Agent, or Firm* — Wenderoth, Lind & Ponack, L.L.P.

(57) ABSTRACT

A sliding structure for a vehicle seat, the sliding structure configured to attach the vehicle seat slidably in an anteroposterior direction to a vehicle body. The sliding structure including: a seat positioning portion including positioning holes formed in the vehicle body and aligned in the anteroposterior direction, and a positioning pin attached to the seat and configured to be movable to a projecting position projected to one of positioning holes to be engageable therewith, and to a withdrawing position withdrawn from the positioning hole; and a seat slide support portion including a seat support portion formed with the vehicle body, a seat attachment portion disposed at the bottom of the seat and having a long hole extending in the anteroposterior direction, and a seat guide portion provided to the seat support portion and configured to be engaged with the long hole and guide the seat movably in the anteroposterior direction.

7 Claims, 6 Drawing Sheets

(56) References Cited

U.S. PATENT DOCUMENTS

| | | | |
|---|---|---|---|
| 2007/0290116 A1* | 12/2007 | Lambert | B60N 2/07 248/429 |
| 2009/0230712 A1* | 9/2009 | Maier | B60N 2/062 296/65.13 |
| 2009/0256388 A1* | 10/2009 | Tanaka | B60N 2/3031 296/186.4 |
| 2011/0043010 A1* | 2/2011 | Diemer | B60N 2/07 297/217.3 |
| 2011/0148144 A1* | 6/2011 | Kosuge | B60P 3/423 296/182.1 |
| 2011/0156427 A1* | 6/2011 | Morita | B60N 2/24 296/26.08 |
| 2012/0318949 A1* | 12/2012 | Braun | B60N 2/07 248/429 |
| 2014/0138997 A1* | 5/2014 | Schulz | B60N 2/0244 297/344.24 |
| 2015/0329148 A1* | 11/2015 | Borowicz | B60K 17/08 180/291 |

\* cited by examiner

SLIDING STRUCTURE FOR VEHICLE SEAT

BACKGROUND OF THE INVENTION

1. Field of the Invention

The present invention relates to a sliding structure for a vehicle seat.

2. Description of the Related Art

A conventionally known vehicle seat is configured to be displaceable in the anteroposterior direction. For example, U.S. Pat. No. 8,152,215 discloses a structure of attaching a vehicle seat. The attachment structure includes a plurality of bolt insertion holes that is aligned in the anteroposterior direction at each of four corners of the bottom of the vehicle seat, and bolt fastening portions that are provided to a chassis frame correspondingly to the four corners of the bottom of the seat. When a bolt is inserted to one of the bolt insertion holes selected from the plurality of bolt insertion holes and is fastened to a corresponding one of the bolt fastening portions, the vehicle seat can be displaced to an anteroposterior position corresponding to the selected bolt insertion hole.

SUMMARY OF THE INVENTION

The vehicle seat is fixed to the chassis frame at the four positions in this attachment structure of the vehicle seat. In order to displace the vehicle seat in the anteroposterior direction, it is necessary to loosen the bolts at the four positions of the bottom of the vehicle seat, displace the seat in the anteroposterior direction, and then fasten the bolts at the four position of the vehicle seat. More specifically, displacing the vehicle seat in the anteroposterior direction requires the tasks of detaching and attaching the bolt using a tool and the task of adjusting the position of the vehicle seat so that one of the bolt insertion holes matches the bolt fastening portion at each of the four positions of the bottom of the vehicle seat. In this manner, this structure needs burdensome work for displacement of the vehicle seat in the anteroposterior direction.

The present invention has been made in view of the problem mentioned above, and an object thereof is to provide a sliding structure for a vehicle seat, simply configured to facilitate displacement in the anteroposterior direction.

In order to achieve the object mentioned above, the present invention provides a sliding structure for a vehicle seat, the sliding structure configured to attach the vehicle seat slidably in an anteroposterior direction to a vehicle body, the sliding structure includes: at least one seat positioning portion including a plurality of positioning holes provided to the vehicle body and aligned in the anteroposterior direction, and a positioning pin provided to the seat and configured to be movable to a projecting position where the positioning pin projects to one of the plurality of positioning holes to be engageable therewith, and to a withdrawing position withdrawn from the positioning hole; and a seat slide support portion including a seat support portion provided to the vehicle body, a seat attachment portion provided to the seat and having a long hole extending in the anteroposterior direction, and a seat guide portion provided to the seat support portion and configured to be engaged with the long hole and guide the seat movably in the anteroposterior direction.

According to the above configuration, the seat is supported movably in the anteroposterior direction by the seat slide support portion. The seat can be easily slid in the anteroposterior direction without attaching or detaching the fastening bolt fixing the seat to the vehicle body. The seat positioning portion can regulate the anteroposterior position of the seat. The seat can be thus easily displaced in the anteroposterior direction. This seat sliding structure is simply configured without including any slide rail, which suppresses increase in cost.

The sliding structure for the vehicle seat preferably has any of the following configurations.

(1) The seat positioning portion is located below a front portion of the seat.

In the configuration (1), the seat positioning portion is located below the seat front portion so as to be accessible even from a crew sitting on the seat. The slide pin can be thus made to project or recede easily.

(2) The positioning pin freely projects and recedes upward and downward.

The positioning pin can be made to project and recede more easily in the configuration (2).

(3) The positioning pin freely projects and recedes in a vehicle width direction.

In the configuration (3), the positioning pin is reduced in vertical size and is thus easily located below the seat.

(4) The seat includes a seat frame configuring a framework, the seat frame has a cross member extending in a vehicle width direction, and the positioning pin is attached to the cross member.

The configuration (4) enhances flexibility in designing location of the positioning pin in the vehicle width direction.

(5) The seat attachment portion has a slide member at least at one of a contact portion with the seat support portion and a contact portion with the seat guide portion.

The configuration (5) enables the slide member to slide the seat smoothly and thus improves seat sliding workability.

(6) A plurality of seat positioning portions is provided.

The configuration (6) includes the plurality of seat positioning portions to improve accuracy of positioning the seat to the vehicle body. The seat is thus prevented from being attached while being slanted to the left or right with respect to the anteroposterior direction. Neither the long hole nor the seat fastening portion needs to prevent slant of the seat, and less size accuracy is thus required to the long hole and the seat fastening portion.

DETAILED DESCRIPTION OF THE INVENTION

FIGS. 1 to 6 each show a utility vehicle including a seat sliding structure according to the present invention. A preferred embodiment of the present invention will now be described with reference to these drawings. For easier description, assume that the utility vehicle travels "forward"

with respect to the utility vehicle and respective components, and right and left sides of a crew corresponds to "right and left sides" of the utility vehicle and the respective components.

Figure 1:
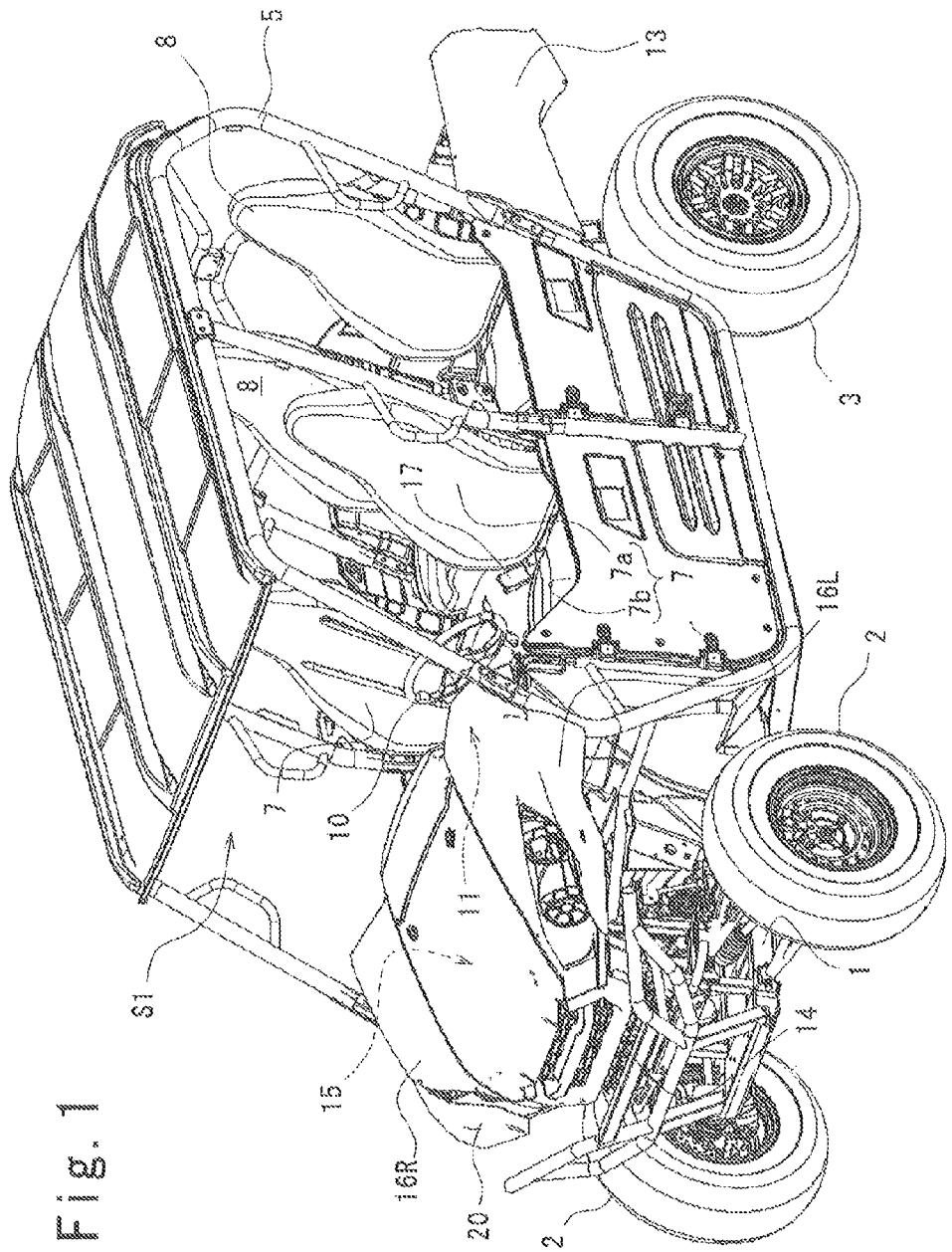
FIG. 1 is a perspective view of a utility vehicle including a seat sliding structure according to an embodiment of the present invention.

As shown in FIG. 1, the utility vehicle includes a chassis frame 1, right and left front wheels 2 located at the front end of the chassis frame 1, and right and left rear wheels 3 located at the rear end of the chassis frame 1. A riding space S1 is located between the front wheels 2 and the rear wheels 3 in the anteroposterior direction, and is surrounded with a R. O. P. S. 5. The riding space S1 accommodates right and left front seats 7 and right and left rear seats 8. A steering wheel 10 and a dashboard 11 are provided at the front end of the riding space S1, and an engine (not shown) is located below the front seats 7. The R. O. P. S. is an abbreviation for a rollover protective structure.

The utility vehicle further includes a carrier 13 located behind the riding space S1, and a front cover assembly 20 located ahead of the riding space S1 and covering a front chamber 15 as well as right and left wheel housings 16R and 16L. The front chamber 16 accommodates a radiator 14 for an engine coolant, at the front end.

Figure 2:
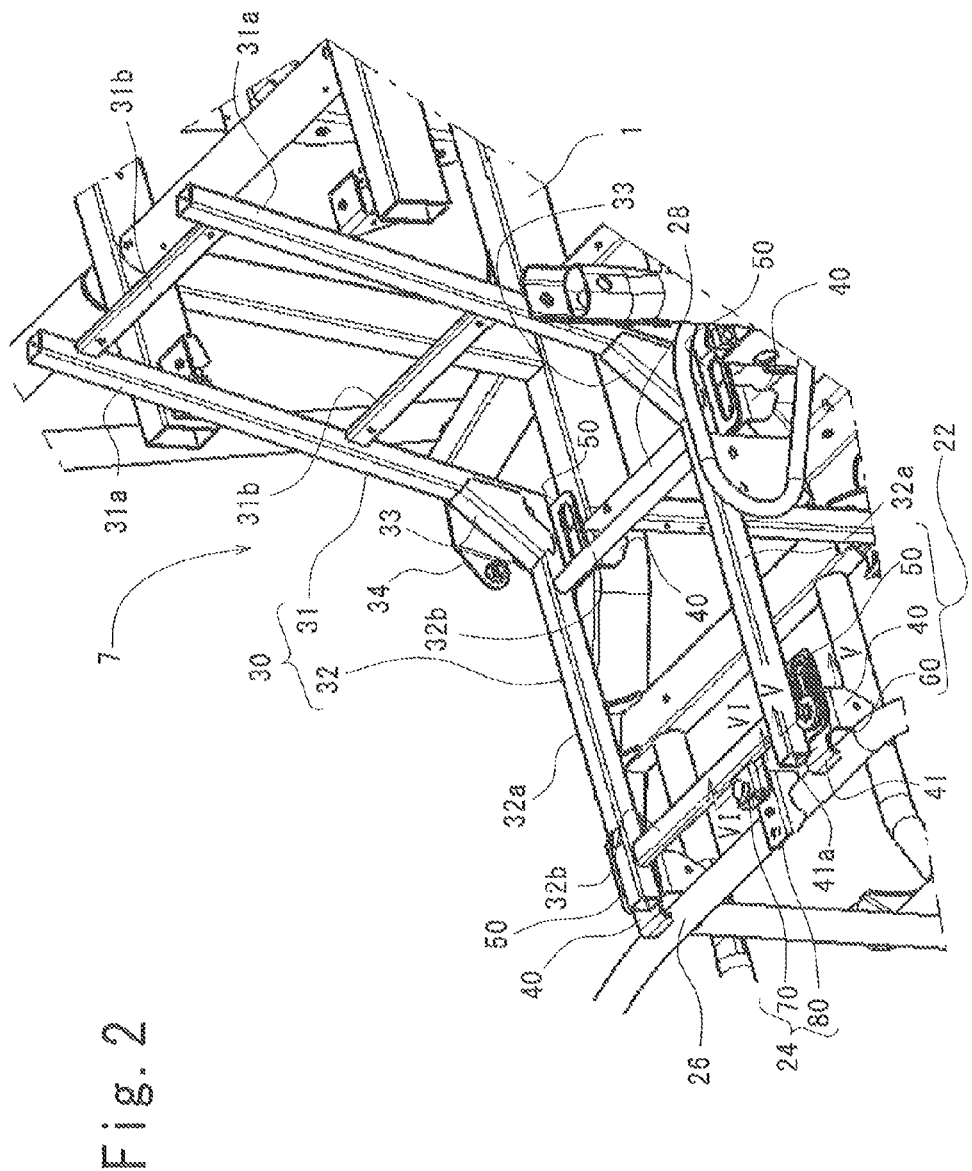
FIG. 2 is a perspective view of attachment of a seat to a vehicle body.

FIG. 2 shows attachment of the left front seat 7 to the chassis frame 1. The front seat 7 shown in FIG. 2 is not provided with a seat back 7a (see FIG. 1) and a seat cushion 7b (see FIG. 1). FIG. 2 shows a seat frame 30 but does not show a floor panel 18 (see FIG. 3) configuring a floor surface of the riding space. The sliding structure for the vehicle seat according to an embodiment of the present invention is described below by exemplifying the left front seat 7.

As shown in FIG. 2, the chassis frame 1 includes a first cross member 26 located substantially at the front portion of the front seat 7 and extending in the vehicle width direction, and a second cross member 28 located substantially at the rear portion of the front seat 7 and extending in the vehicle width direction. The front seat 7 is configured to be movable in the anteroposterior direction and be positioned at a desired anteroposterior position. More specifically, the sliding structure for the front seat 7 includes seat slide support portions 22 configured to support the front seat 7 movably in the anteroposterior direction, and a seat positioning portion 24 configured to position the front seat 7 in the anteroposterior direction.

Each of the seat slide support portions 22 at least includes a seat attachment portion 50 located at each of four corners of the bottom of the front seat 7, a seat support portion 40 provided to the chassis frame 1 correspondingly to each of the seat attachment portions 50, and a seat guide portion 60 configured to attach each of the seat attachment portions 50 movably in the anteroposterior direction to corresponding one of the seat support portions 40.

The seat positioning portion 24 at least includes a positioning pin portion 70 located below the front portion the front seat 7, and a positioning hole portion 80 provided to the chassis frame 1.

[Seat Frame 30]

The seat frame 30 has an upper seat frame 31 supporting the seat back 7a (see FIG. 1) and a bottom seat frame 32 supporting the seat cushion 7b (see FIG. 1). The upper seat frame 31 has a pair of right and left upper pipes 31a and 31a slanted backward as extending upward, and upper cross pipes 31b and 31b connecting, in the vehicle width direction, upper portions and lower portions of the upper pipes 31a.

The bottom seat frame 32 has a pair of right and left bottom pipes 32a and 32a extending forward from the lower end of the upper seat frame 31, and bottom cross pipes 32b and 32b connecting, in the vehicle width direction, front portions and rear portions of the bottom pipes 32a. The upper seat frame 31 and the bottom seat frame 32 are joined to each other at joints provided with gussets 33 configured to reinforce the joints. The gusset 33 located inside in the vehicle width direction is provided with a seat belt attachment bracket 34 fixing a seat belt 17 (see FIG. 1).

[Seat Support Portion 40]

A plurality of seat support portions 40 is provided correspondingly to the seat attachment portion 50 located at each of the four corners of the bottom of the seat frame 30. The seat support portions 40 each have a seat support member 41 supporting the seat attachment portion 50 and a female screw portion 42 (see FIG. 5) provided to the seat support member 41. The seat support member 41 has a seat support surface 41a in contact with the seat attachment portion 50 from below to support the seat. The female screw portion 42 is provided to the back surface (downside) of the seat support surface 41a.

Each of the plurality of seat support members 41 is attached to the first cross member 26 or the second cross member 28 by welding or the like. Each of the seat support members 41 can be thus easily located at a preferred position in the vehicle width direction along the extending direction of the first or second cross member 26 or 28. This enhances flexibility in designing location of the seat support portions 40.

[Seat Attachment Portion 50]

Figure 3:
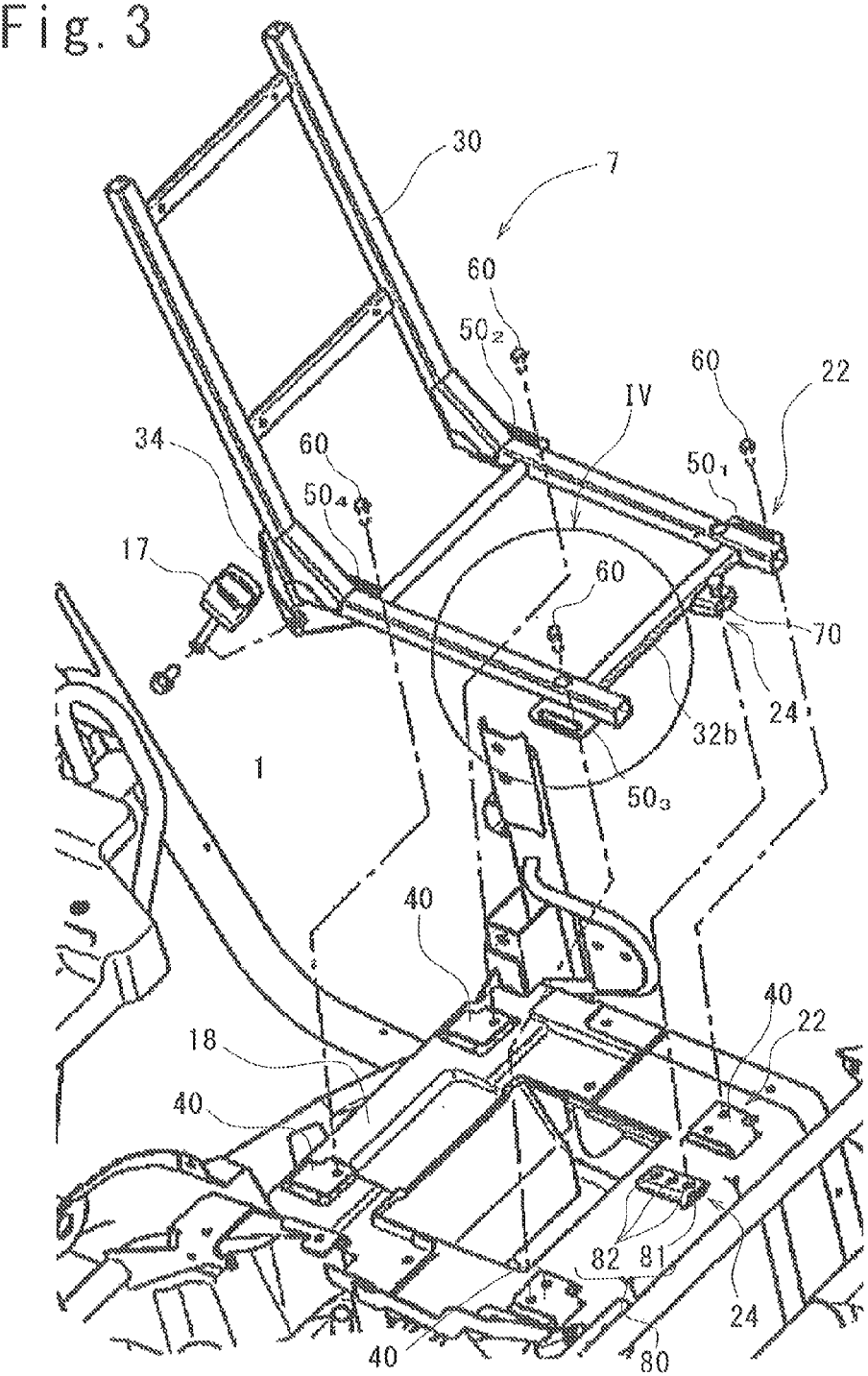
FIG. 3 is an exploded perspective view of a state where the seat shown in FIG. 2 is detached from the vehicle body.

FIG. 3 is an exploded perspective view of a state where the front seat 7 is detached from the chassis frame 1. Similarly to FIG. 2, the front seat 7 shown in FIG. 3 is not provided with the seat back 7a and the seat cushion 7b. FIG. 3 shows the seat frame 30 and the floor panel 18.

As shown in FIG. 3, the seat attachment portions 50 are each attached to corresponding one of the bottom pipes 32a. More specifically, seat attachment portions $50_1$ and $50_2$ are located outside in the vehicle width direction, respectively at the front and rear portions of the bottom pipe 32a that is located outside in the vehicle width direction. Seat attachment portions $50_3$ and $50_4$ are located inside in the vehicle width direction at the front portion and outside in the vehicle width direction at the rear portion, respectively, of the bottom pipe 32a that is located inside in the vehicle width direction. The seat attachment portion $50_4$ is located outside in the vehicle width direction of the bottom pipe 32a, so as to avoid the seat belt 17 and the seat belt attachment bracket 34 that are positioned inside in the vehicle width direction of the bottom pipe 32a located inside in the vehicle width direction.

Figure 4:
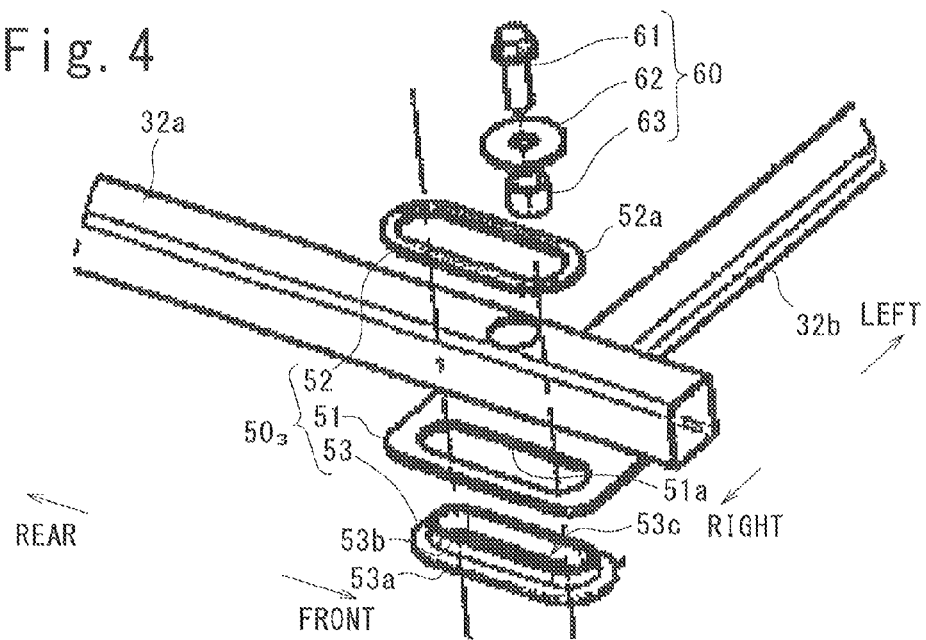
FIG. 4 is an enlarged perspective view of a seat slide support portion, showing an enlarged IV portion in FIG. 3.

FIG. 4 shows an enlarged IV portion indicated in FIG. 3, and is an exploded perspective view of the seat attachment portion $50_3$ at the front portion of the bottom pipe 32a located inside in the vehicle width direction. The configuration of the seat attachment portion 50 is described by exemplifying the seat attachment portion $50_3$. As shown in FIG. 4, the seat attachment portion $50_3$ has a seat attachment bracket 51 in a plate shape, as well as an upper slide member 52 and a lower slide member 53 located above and below the seat attachment bracket 51.

The seat attachment bracket 51 is attached to the lower surface of the bottom pipe 32a by welding or the like, and extends in the anteroposterior direction parallel to the seat support surface 41a (see FIG. 2) of the seat support portion 40. The seat attachment bracket 51 is provided, substantially at the center, with a long hole 51a that extends in the anteroposterior direction and vertically penetrates the seat attachment bracket 51.

Each of the upper slide member 52 and the lower slide member 53 is a slidable member having a smooth surface, and is made of resin member such as nylon or polypropylene. Each of the upper slide member 52 and the lower slide member 53 is not limited to such a resin member, but can be a metal member, any member processed by surface treatment to have a smooth surface, any member containing a lubricant, or the like.

The upper slide member 52 has a plate shape and is located on the upper surface of the seat attachment bracket 51, and is provided, at the center, with a long hole 52a extending in the anteroposterior direction. The long hole 52a is sized substantially equally to the long hole 51a in the seat attachment bracket 51.

The lower slide member 53 has a proximal portion 53a located on the lower surface of the seat attachment bracket 51, a projection 53b projecting upward from the proximal portion 53a and passing through the long hole 51a, and a long hole 53c vertically penetrating from the proximal portion 53a to the projection 53b. The proximal portion 53a is shaped substantially equally to the upper slide member 52. The projection 53b has a sectional shape substantially same as that of the long hole 51a. The long hole 53c is located substantially at the center of the lower slide member 53 and extends in the anteroposterior direction in a planar view.

Described next is assembly of the upper slide member 52 and the lower slide member 53 to the seat attachment bracket 51. The lower slide member 53 is initially assembled to the seat attachment bracket 51. While the projection 53b is fitted and inserted from below to the long hole 51a in the seat attachment bracket 51, the proximal portion 53a is brought into substantial contact with the lower surface of the seat attachment bracket 51. In this state, the long hole 52a in the upper slide member 52 is fitted to surround a portion projecting upward from the upper surface of the seat attachment bracket 51, of the projection 53b. The upper slide member 52 and the lower slide member 53 are joined to each other with the seat attachment bracket 51 being interposed between.

The upper slide member 52 and the lower slide member 53 are attached to the upper and lower surfaces of the seat attachment bracket 51 to obtain the seat attachment portion 50. In the state where the seat attachment bracket 51, the upper slide member 52, and the lower slide member 53 are assembled, the seat attachment portion 50 is provided with the long hole 53c that is located inside the long hole 51a in the seat attachment bracket 51, extends in the anteroposterior direction, and penetrates vertically.

[Seat Guide Portion 60]

Figure 5:
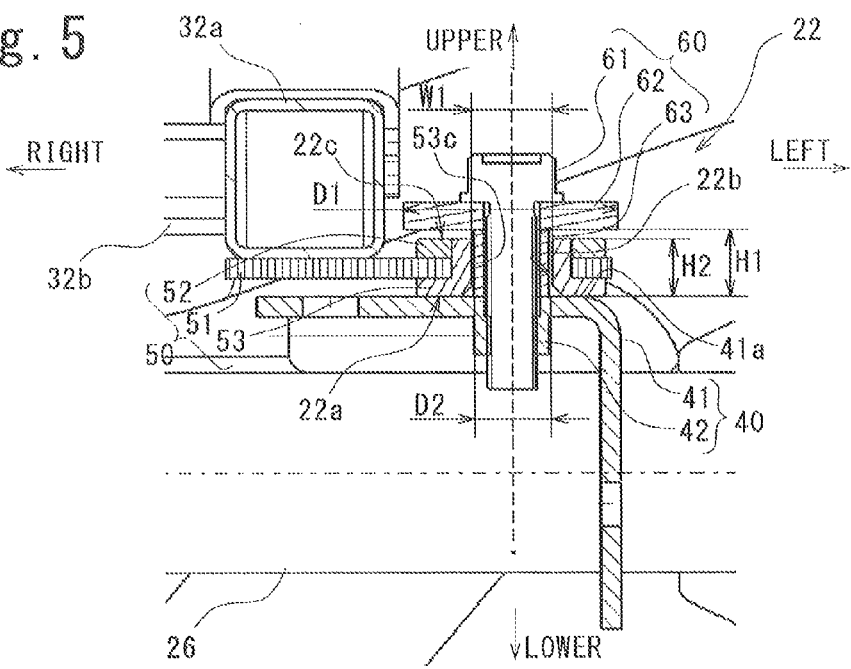
FIG. 5 is a sectional view of the seat slide support portion, taken along line V-V indicated in FIG. 2.

The seat guide portion 60 has a fastening bolt 61, a washer 62, and a collar 63. FIG. 5 shows a vertical section taken along the axis of the seat guide portion 60 in the seat slide support portion 22. As shown in FIG. 5, the washer 62 is located on the upper surface of the upper slide member 52, and has a diameter D1 larger than a hole width W1 of the long hole 53c. The collar 63 is fitted and inserted to the long hole 53c and has a vertical height H1 larger than a height H2 of the seat attachment portion 50. The collar 63 has a diameter D2 slightly smaller than the hole width W1 of the long hole 53c. In other words, the collar 63 is provided to have slight backlash in the long hole 53c, so that the long hole 53c is movable forward and backward relative to the collar 63. The fastening bolt 61 is inserted through the inner diameter portion of the collar 63, and is fastened to the female screw portion 42 of the seat support portion 40.

More specifically, the fastening bolt 61 is fastened to the female screw portion 42 of the seat support portion 40 with the collar 63 being interposed therebetween. The seat attachment portion 50 is thus movably attached to the seat support portion 40. When the collar 63 larger in height than the height H2 of the seat attachment portion 50 is interposed, fastening force of the fastening bolt 61 is not applied to the seat attachment portion 50. The seat attachment portion 50 is thus movable relative to the seat support portion 40 and the fastening bolt 61.

With reference also to FIG. 2, the seat slide support portion 22 is provided at each of the four corners of the bottom of the front seat 7, and the long hole 53c extends in the anteroposterior direction at each of the seat attachment portions 50. Each of the seat attachment portions 50 at the front seat 7 is regulated movably in the anteroposterior direction by the seat guide portion 60 (the collar 63) engaged with the long hole 53c. In this state, the seat attachment portions 50 each have a first slide portion 22a at a contact portion between the lower slide member 53 and the seat support surface 41a, a second slide portion 22b at a contact portion between the long hole 53c and the collar 63, and a third slide portion 22c at a contact portion between the upper slide member 52 and the washer 62.

While the seat attachment portion 50 is supported movably in the anteroposterior direction relative to the seat support portion 40, the seat slide support portion 22 can be supported from below by the first slide portion 22a, can be supported in the vehicle width direction by the second slide portion 22b, and can be supported from above by the third slide portion 22c. The seat attachment portion 50 can be thus preferably slid upward, downward, and in the vehicle width direction, relative to the seat support portion 40. This configuration improves seat sliding workability. The third slide portion 22c is provided so that the seat attachment portion 50 can be regulated from above and below by the first and third slide portions 22a and 22c and be supported slidably in the anteroposterior direction even when the seat attachment portion 50 is displaced upward or downward due to warp, deformation, attachment backlash, or the like of the seat frame 30.

[Seat Positioning Pin Portion 70]

Figure 6:
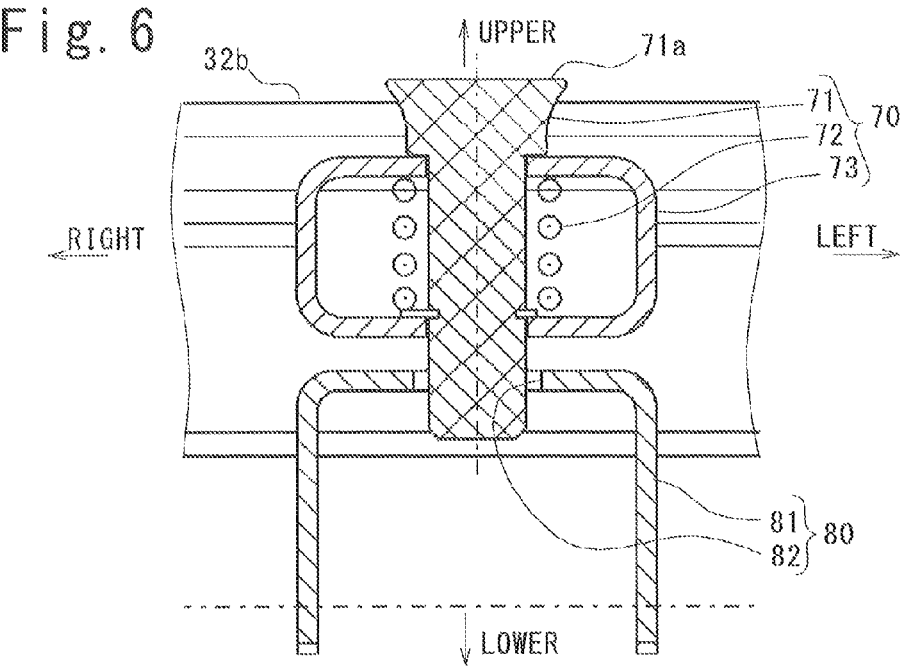
FIG. 6 is a sectional view of a positioning portion, taken along line VI-VI indicated in FIG. 2.

FIG. 6 is a vertical sectional view taken along line VI-VI indicated in FIG. 2, of the seat positioning pin portion 70 and the seat positioning hole portion 80. As shown in FIG. 6, the seat positioning pin portion 70 is located above the seat positioning hole portion 80, and includes a pin 71 provided to be movable upward and downward, an elastic member 72 biasing downward the pin 71, a holder 73 holding the pin 71 and the elastic member 72, and a circlip 74 fixed to the pin 71 and being in contact with the lower end of the elastic member 72.

The pin 71 is provided, at the top, with an operation knob 71a. When the operation knob 71a is pulled upward against the elastic member 72 via the circlip 74, the pin 71 can be moved to a withdrawing position so as to withdraw upward from the seat positioning hole portion 80. In the state where the operation knob 71a is not pulled upward, the pin 71 is biased by the elastic member 72 via the circlip 74 and can be moved to a projecting position so as to project downward toward the seat positioning hole portion 80. The elastic member 72 can be embodied as a compression coil spring, for example. The holder 73 is attached to the front bottom cross pipe 32b (see FIG. 2) such that the axis of the pin 71 matches the center line in the vehicle width direction of the seat positioning hole portion 80.

[Seat Positioning Hole Portion 80]

As shown in FIG. 3, the seat positioning hole portion 80 includes a bracket 81 attached to the first cross member 26 (see FIG. 2) of the chassis frame 1, and a plurality of positioning holes 82 provided in the bracket 81. The plurality of positioning holes 82 is aligned at predetermined intervals in the anteroposterior direction. According to the present embodiment, three positioning holes 82 are provided at equal intervals in the anteroposterior direction. The number of the positioning holes 82 has only to be plural and is not limited to three. For example, the number of the positioning holes 82 can be two, or four or more. The plurality of positioning holes 82 is not necessarily located at equal intervals. In other words, the number and intervals of the positioning holes 82 can be set so that front seat 7 can be located at desired positions and adjusted in a desired range in the anteroposterior direction.

More specifically, the pin 71 is engaged with one of the plurality of positioning holes 82 in the seat positioning portion 24, so that the front seat 7 can be adjusted to an anteroposterior position corresponding to the engaged positioning hole 82. The seat positioning pin portion 70 is provided to the bottom cross pipe 32b extending in the vehicle width direction, whereas the seat positioning hole portion 80 is provided to the first cross member 26 (see FIG. 2) extending in the vehicle width direction. The seat positioning pin portion 70 and the seat positioning hole portion 80 can be thus easily located along the extending direction of the first cross member 26 (see FIG. 2). This enhances flexibility in designing location of the seat positioning portion 24, and the seat positioning portion 24 can be located at a position allowing a crew to operate easily.

The seat sliding structure configured as described above can achieve the following effects.

(1) At each of the four corners of the bottom of the front seat 7, the seat attachment portion 50 can be attached to the seat support portion 40 by the seat guide portion 60 fastened to the seat support portion 40. Furthermore, the first to third slide portions 22a to 22c can support the seat attachment portion 50 movably in the anteroposterior direction relative to the seat support portion 40. The seat positioning portion 24 can regulate the anteroposterior position of the front seat 7. In other words, the front seat 7 can be easily slid in the anteroposterior direction with no need to detach and attach the fastening bolts 61 fixing the front seat 7 to the vehicle body. The front seat 7 can be thus easily displaced in the anteroposterior direction.

(2) The seat sliding structure is simply configured without including any slide rail, which suppresses increase in cost. Furthermore, the front seat 7 can be attached to the chassis frame 1 by placing the seat attachment portions 50 on the seat support portions 40. The sliding structure for the vehicle seat can be thus made smaller in height than a structure including a slide rail. The seat slide support portion 22 having such smaller height will prevent foreign matters from entering the seat slide support portion 22. This feature is particularly preferred to a utility vehicle that often travels on uneven roads (unpaved roads) and is likely to have mud, sand, water, and the like on the roads enter the vehicle. The seat slide support portions 22, . . . , 22 are provided respectively at the four corners of the bottom of the front seat 7. This sliding structure for the vehicle seat does not extend entirely in the anteroposterior direction at the bottom of the seat as a slide rail does. This configuration achieves reduction in size in the anteroposterior direction of the sliding structure for the vehicle seat.

(3) The seat positioning portion 24 is located below the front portion of the front seat 7 so as to be accessible even from a crew sitting on the front seat 7. The pin 71 can be thus made to project and recede easily by operating the operation knob 71a. Positioning of the front seat 7 can be accomplished by operating the seat positioning portion 24 below the front portion of the front seat 7, with no need to position at the four corners of the bottom of the front seat 7. The front seat 7 can be thus displaced more easily in the anteroposterior direction.

(4) The pin 71 is freely made to project and recede upward and downward. A crew sitting on the front seat 7 can easily operate the pin 71 from above, and the pin 71 can be made to project and recede more easily.

(5) The pin 71 is attached to the bottom cross pipe 32b. This configuration enhances flexibility in designing location of the pin 71 in the vehicle width direction.

(6) The seat attachment portion 50 has the first to third slide portions 22a to 22c at the contact portion with the seat support portion 40 and/or the contact portion with the seat guide portion 60. This configuration allows the front seat 7 to be slid more smoothly and improves seat sliding workability.

Figure 7:
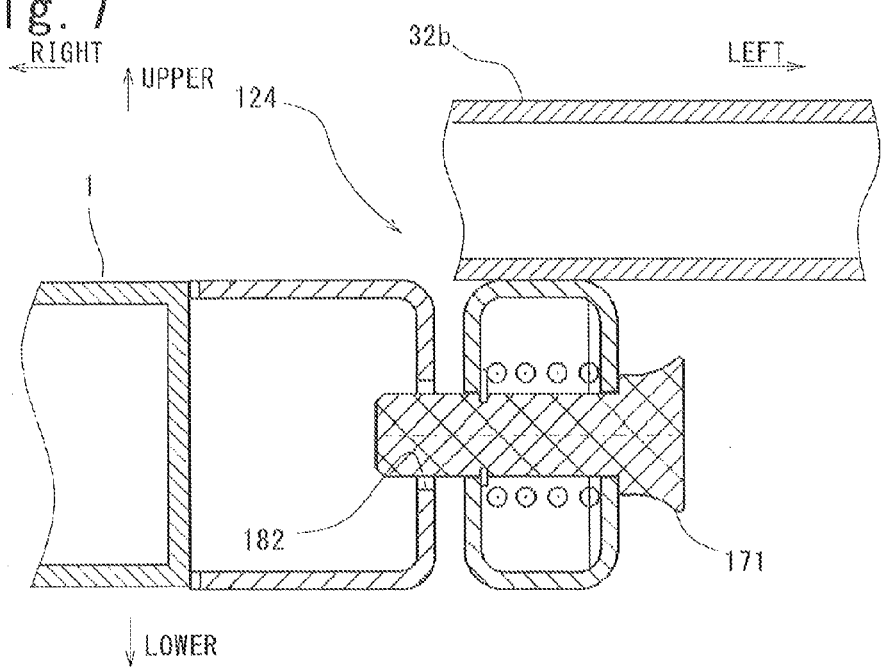
FIG. 7 is a sectional view of a seat positioning portion viewed from the front according to another embodiment.

The seat positioning portion 24 according to the embodiment described above includes the pin 71 configured to move upward and downward. As shown in FIG. 7, the seat positioning portion 124 can be alternatively replaced with a seat positioning portion 124 that includes a pin 171 configured to move in the vehicle width direction and a seat positioning hole 182 penetrating in the vehicle width direction and configured to be engageable with the pin 171.

The pin 171 is made to freely project and recede in the vehicle width direction. The seat positioning portion 124 can be reduced in vertical size so as to be easily located below the seat.

Figure 8:
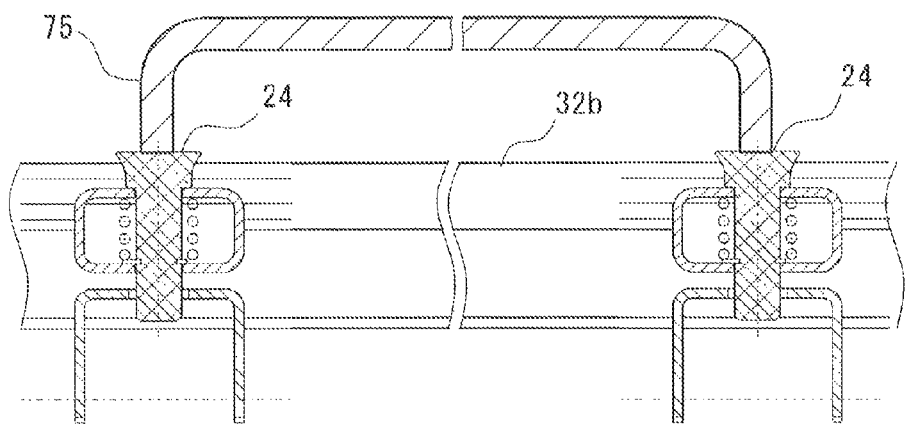
FIG. 8 is a sectional view of a seat positioning portion viewed from the front according to still another embodiment.

The structure according to the embodiment described above includes the single seat positioning portion 24. As shown in FIG. 8, a plurality of seat positioning portions 24 can be provided alternatively. FIG. 8 exemplifies a case where two seat positioning portions 24 are provided at different positions in the vehicle width direction. In this case, a connecting member 75 connecting the pins 71 and 71 of the plurality of seat positioning portions 24 can be provided so that the pins 71 and 71 can be simultaneously moved upward and downward.

The plurality of seat positioning portions 24 can thus position the seat, which improves seat positioning accuracy. This configuration can prevent the seat from being attached while being slanted to the left or right with respect to the anteroposterior direction. In this case, slant of the seat to the left or right with respect to the anteroposterior direction does not need to be prevented dependently on the positional relation between the long hole 53c and the seat guide portion 60 (the collar 63) in the seat slide support portion 22. Less size accuracy is thus required to the long hole 53c or the seat guide portion 60.

The above embodiment exemplifies the front seat 7 on the left side to describe the sliding structure for the vehicle seat. The present invention is not limited to this case but the sliding structure for the vehicle seat is applicable to the front seat 7 on the right side or the rear seat 8.

The present invention can be modified or changed in various manners without departing from the spirit and scope of the present invention recited in the following claims.

What is claimed is:

1. A sliding structure for a vehicle seat, the sliding structure configured to attach the vehicle seat slidably in an anteroposterior direction to a vehicle body, the sliding structure comprising:
 at least one seat positioning portion configured to position the seat in the anteroposterior direction and a seat slide support portion configured to support the seat movably in the anteroposterior direction,
 wherein the seat positioning portion includes a positioning hole portion including a plurality of positioning holes aligned in the anteroposterior direction, and a positioning pin attached to a seat frame and configured to be movable to a projecting position where the positioning pin projects to one of the plurality of positioning holes to be engageable therewith, and to a withdrawn position where the positioning pin is withdrawn from the positioning holes;

wherein the positioning pin enables the seat to be positioned in the anteroposterior direction at the projecting position, and the positioning pin allows the seat to slide in the anteroposterior direction at the withdrawn position; and wherein the seat slide support portion includes: a plurality of seat attachment portions located at four corners of a bottom of the seat, respectively; a plurality of seat support portions attached to a chassis frame so as to correspond to the seat attachment portions, respectively; and a plurality of seat guide portions configured to be attached at the seat attachment portions, respectively, and each of the seat guide portions being movable in the anteroposterior direction relative to the corresponding one of the seat support portions, wherein each of the seat attachment portions is attached to the seat frame, extends in the anteroposterior direction parallel to a seat support surface and is provided, substantially at the center, with an elongated hole that extends in the anteroposterior direction and vertically penetrates the seat attachment portion, and wherein each of the seat guide portions has a fastening bolt, a washer, and a collar, the washer being positioned on an upper surface of the respective seat attachment portion and having a diameter that is larger than a hole width of the elongated hole in a vehicle width direction, the collar being fitted and inserted in the elongated hole with an axis thereof being aligned in the vertical direction, the collar having a vertical height that is larger than a height of the seat attachment portion, and a diameter that is slightly smaller than the hole width of the elongated hole, the fastening bolt being inserted through an inner diameter portion of the collar with a head portion thereof being positioned on the washer and fastened to the seat support portion.

2. The seat sliding structure according to claim 1, wherein the seat positioning portion is located below a front portion of the seat.

3. The seat sliding structure according to claim 1, wherein the positioning pin is movable in a vertical direction.

4. The seat sliding structure according to claim 1, wherein the positioning pin is movable in a vehicle width direction.

5. The seat sliding structure according to claim 1, wherein the seat frame has a cross member extending in a vehicle width direction, and the positioning pin is attached to the cross member.

6. The seat sliding structure according to claim 1, wherein each of the seat attachment portions has a slide member at least at one of a contact portion with the seat support portion and a contact portion with the seat guide portion.

7. The seat sliding structure according to claim 1, wherein a plurality of seat positioning portions is provided.

* * * * *